United States Patent

Izumi et al.

[11] Patent Number: 4,473,753
[45] Date of Patent: Sep. 25, 1984

[54] WASTE KINETIC ENERGY RECLAIMING SYSTEM FOR A VEHICLE

[75] Inventors: Hisashi Izumi; Shigeru Saito; Shuuji Torii, all of Yokohama; Kiyotaka Ozaki, Yokosuka, all of Japan

[73] Assignee: Nissan Motor Company, Limited, Yokohama, Japan

[21] Appl. No.: 408,627

[22] Filed: Aug. 16, 1982

[30] Foreign Application Priority Data

Sep. 8, 1981 [JP] Japan ............................. 56-133515[U]

[51] Int. Cl.³ .......................... B60K 1/00; B60K 9/04; B60L 11/22
[52] U.S. Cl. ...................................... 290/45; 290/1 R; 290/4 C; 290/16; 180/165; 318/139
[58] Field of Search .................... 290/16, 45; 180/55, 180/65; 320/7, 14, 61; 60/911; 318/139, 140, 303, 382; 307/9, 10

[56] References Cited

U.S. PATENT DOCUMENTS

| | | | |
|---|---|---|---|
| 3,499,163 | 3/1970 | Verreault | 290/16 |
| 3,530,356 | 9/1970 | Aronson | 318/139 X |
| 4,099,589 | 7/1978 | Williams | 290/45 X |
| 4,218,624 | 8/1980 | Schiavone | 290/45 |
| 4,319,140 | 3/1982 | Paschke | 290/45 |
| 4,405,028 | 9/1983 | Price | 290/45 X |

FOREIGN PATENT DOCUMENTS 2332514  1/1975  Fed. Rep. of Germany .

Primary Examiner—B. Dobeck
Assistant Examiner—Terry Flower
Attorney, Agent, or Firm—Schwartz, Jeffery, Schwaab, Mack, Blumenthal & Koch

[57] ABSTRACT

A waste kinetic energy reclaiming system for an engine-driven vehicle includes a generator, and a variable torque-ratio coupling connecting the generator and the vehicle engine. The system also includes a clutch which selectably disconnects the coupling from the engine in response to whether or not braking of the vehicle is required so that the connection between the coupling and the engine is established only when braking is required.

14 Claims, 9 Drawing Figures

4,473,753

WASTE KINETIC ENERGY RECLAIMING SYSTEM FOR A VEHICLE

BACKGROUND OF THE INVENTION

1. Field of the Invention

This invention relates to a waste kinetic energy reclaiming system for a vehicle, and more specifically to a system which converts kinetic energy of a vehicle to electric energy to simultaneously reclaim unnecessary energy and brake the vehicle when braking is required.

2. Description of the Prior Art

Waste kinetic energy reclaiming systems for vehicles, such as motor cars, have been developed to promote fuel economy. For example, Japanese Published Unexamined Utility Model Application No. 56-51442 discloses such an energy reclaiming system. This system has a generator, which converts kinetic energy of the vehicle to electric energy when braking of the vehicle is required. The reclaimed electric energy is supplied to a vehicle battery for later use. In this way, this system reclaims the otherwise unused kinetic energy of the vehicle during braking, thus promoting fuel economy. However, this system is unsatisfactory from the standpoint of structural simplicity and efficiency.

SUMMARY OF THE INVENTION

Accordingly, it is an object of this invention to provide a waste kinetic energy reclaiming system for a vehicle which is efficient.

Another object of this invention is to provide a simple waste kinetic energy reclaiming system for a vehicle.

In accordance with this invention, a waste kinetic energy reclaiming system for an engine-driven vehicle is provided which includes a generator, and a variable torque-ratio coupling connecting the generator to the vehicle engine. The system also includes a clutch which selectably disconnects the coupling from the engine in response to whether or not braking of the vehicle is required so that the connection of the coupling to the engine will be established when braking is required.

The above and other objects, features and advantages of this invention will be apparent from the following description of preferred and alternative embodiments thereof, taken in conjunction with the drawings.

BRIEF DESCRIPTION OF THE DRAWINGS

Like reference characters are used throughout the drawings to designate like parts.

DESCRIPTION OF THE PREFERRED EMBODIMENTS

Figure 1:
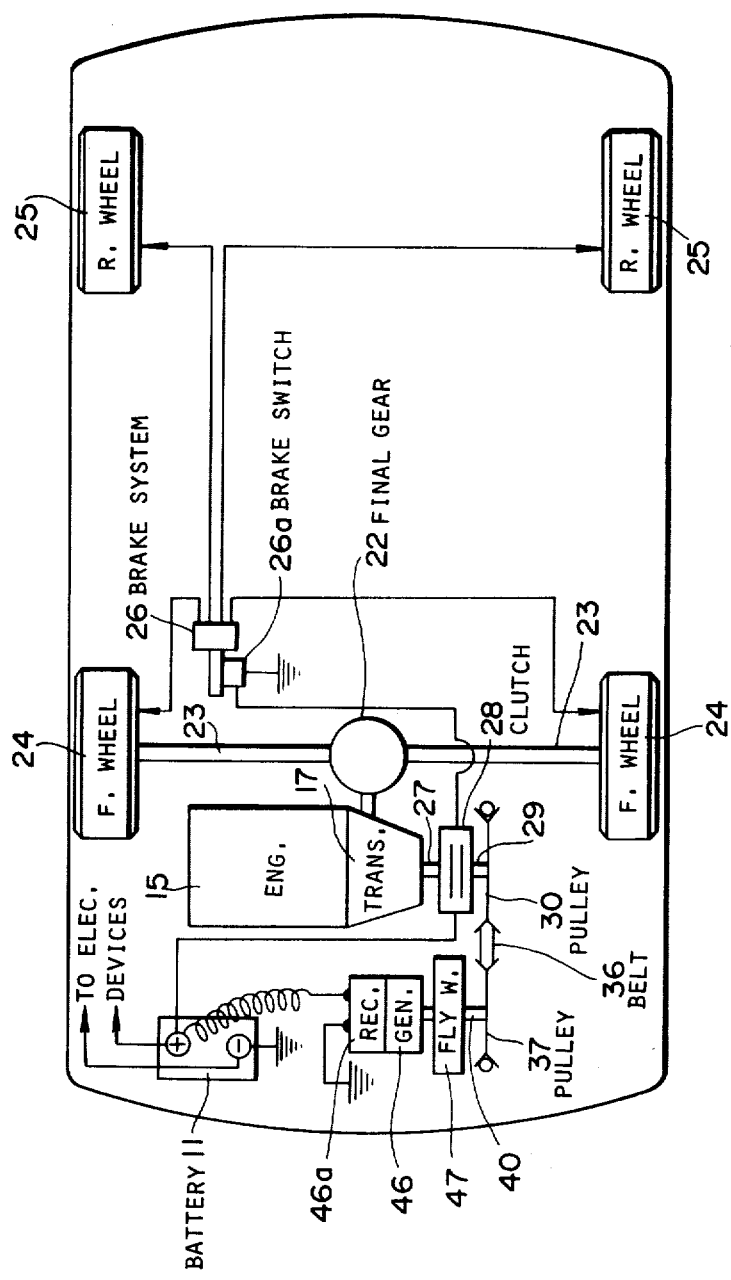
FIG. 1 is a diagrammatic view of an automotive vehicle equipped with a waste kinetic eneregy reclaiming system according to a first embodiment of this invention.

With reference to FIG. 1, there is shown an automotive vehicle equipped with a waste kinetic energy reclaiming system according to a first embodiment of this invention. An engine 15 is mounted on the vehicle and has a crankshaft, which is connected to vehicle front wheels 24 by way of a normal clutch (not shown), a transmission 17, a final gear 22, and laterally extending driving or axle shafts 23 drive the front wheels 24 and thus the vehicle in a well-known manner. The vehicle also has rear wheels 25.

A conventional brake system 26 is mounted on the vehicle to apply braking forces to the vehicle wheels 24 and 25. The brake system 26 has a brake pedal 26b (see FIG. 2). When the brake pedal 26b is depressed, the brakes are applied to the vehicle wheels 24 and 25. When the brake pedal 26b is released, the brakes are also released. A brake pedal switch 26a is driven in accordance with the brake pedal 26b, i.e., the switch 26a is closed when the brake pedal 26b is depressed and is opened when the brake pedal 26b is released.

The transmission 17 has an input shaft (not shown) and an output or main shaft 27 adjustably geared to the input shaft. The input shaft is connected to the crankshaft of the engine 15 by way of the normal clutch. The output shaft 27 is engaged or geared to the final gear 22 in a conventional way. In this way, power output of the engine 15 is transmitted to the final gear 22 by way of the transmission 17. The axle shafts 23 connect the final gear 22 to the front wheels 24, so that power output of the engine 15 is ultimately transmitted to the front wheels 24 to drive them.

The output shaft 27 of the transmission 17 is coupled to a driving shaft 29 by way of an electrically-driven, solenoid-driven, or electromagnetic clutch 28. A driving pulley 30 is mounted on the driving shaft 29, and engages a driven pulley 37 via a closed-loop V-belt 36. The driven pulley 37 is mounted on a driven shaft 40, which is coupled to an electric generator or alternator 46. As the driven shaft 40 rotates, the generator 46 produces electric power. In this way, the output shaft 27 of the transmission 17 is connected to the generator 46 to drive the latter. A flywheel 47 is mounted on the driven shaft 40.

Figure 2:
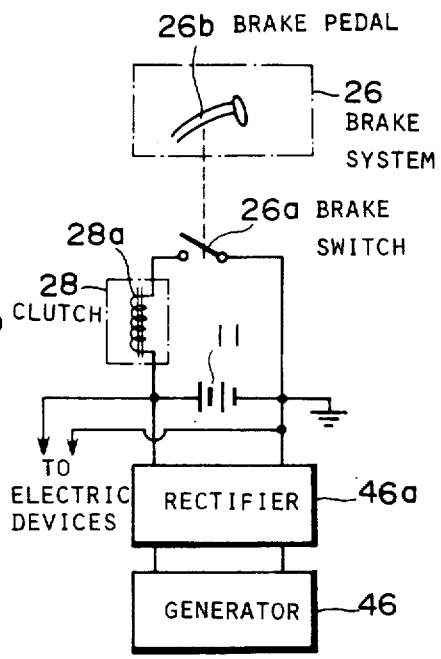
FIG. 2 is a schematic diagram of a circuit for controlling the clutch of FIG. 1.

As shown in FIG. 2, the control winding 28a of the clutch 28 is electrically connected across a vehicle storage battery 11 by way of the brake pedal switch 26a. Thus, the control winding 28a is energized when the brake pedal 26b is depressed, and is de-energized when the brake pedal 26b is released. The clutch 28 is engaged when the control winding 28a is energized, and is disengaged when the control winding 28a is de-energized. Therefore, the clutch 28 is engaged when the brake pedal 26b is depressed, and is disengaged when the brake pedal 26b is released. Thus, when the brake pedal 26b is depressed, the generator 46 is connected to the output shaft 27 of the transmission 17 to be driven and receives torque or kinetic energy from the front-wheel drive train and the vehicle. When the brake pedal 26b is released, the driving connection between the generator 46 and the transmission output shaft 27 is broken and, consequently, the generator 46 exerts no load on the front-wheel drive train and particularly the engine 15.

As best shown in FIG. 2, the generator 46 is electrically connected across the battery 11 by way of a rectifier or rectifying circuit 46a to supply electrical energy to the battery 11. Electrical energy produced by the generator 46 is thus stored in the battery 11 and powers other vehicle electrical devices (not shown), such as light bulbs and the ignition system.

Figure 3:
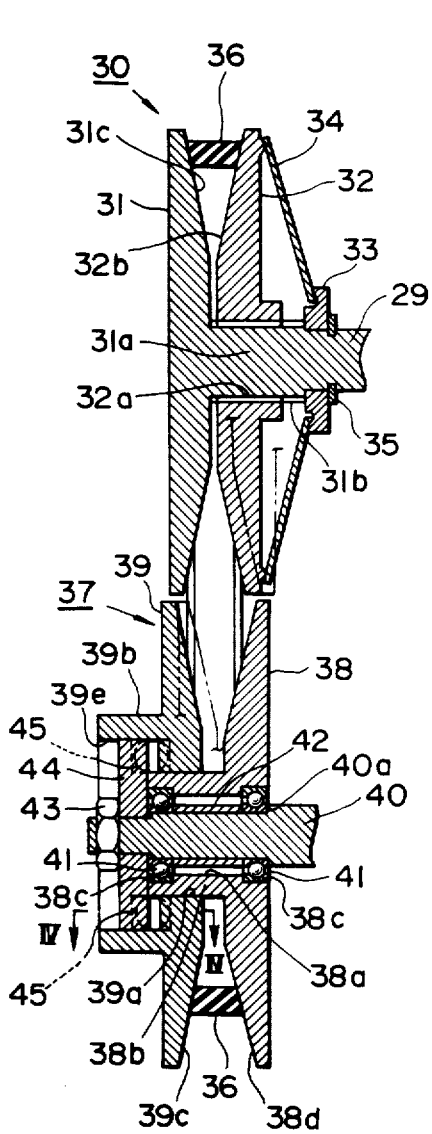
FIG. 3 is a cross-sectional view of the driving and driven pulleys of FIG. 1.

As shown in FIG. 3, the driving pulley 30 includes tapered-disk-shaped parallel first and second halves or members 31 and 32 of equal diameter. The first member 31 has a shaft 31a, which extends axially from the center of an end surface of the member 31 and is formed integrally and coaxially with the driving shaft 29. A spline 31b is formed on the periphery of the shaft 31a. A spline hole 32a is provided through the central axis of the second member 32, and accommodates the shaft 31a. The second member 32 engages the first member 31 via the splines, and thus can be axially moved relative to the first member 31 while rotating with the first member 31. Opposing faces of the first and second members 31 and 32 are respectively provided with opposing tapered surfaces 31c and 32b of equal dimensions at their outer portions. The tapered surfaces 31c and 32b define a pulley groove for the driving pulley 30 which is of a V-shaped cross-section. A supporting ring 33 is mounted on the shaft 31a via a snap ring 35 fitted around the driving shaft 29. In fact, the supporting ring 33 is sandwiched between an annular shoulder of the driving shaft 29 and the snap ring 35 to be fixed to the driving shaft 29. The supporting ring 33 can engage the second member 32 to limit its axial displacement away from the first member 31. The inner circular edge of a conical disk spring 34 engages the supporting ring 33, and the outer circular edge thereof engages the end surface of the second member 32 at a surface remote from the first member 31, in order to urge the second member 32 toward the first member 31. The V-belt 36 fits into the pulley groove of the driving pulley 30 to engage the latter. Axial displacement of the second member 32 relative to the first member 31 changes the radius of contact between the V-belt 36 and the driving pulley 30, and thus also changes the effective diameter of the driving pulley 30.

The driven pulley 37 includes tapered-disk-shaped parallel first and second halves or members 38 and 39 having an equal diameter which is essentially the same as that of the members 31 and 32 of the driving pulley 30. The first member 38 has a boss 38b, which extends axially from the center of an end surface thereof. A hole 38a is provided coaxially through the first member 38 and the boss 38b. The driven shaft 40 passes coaxially through the hole 38a. The inner surface of the first member 38 has a pair of opposite annular steps 38c at its ends. A pair of bearings 41 are installed in the steps 38c and abut the driven shaft 40 to rotatably support the first member 38 on the driven shaft 40. The steps 38c limit axial movements of the outer races of the respective bearings 41. A sleeve 42 fits around the driven shaft 40 and is sandwiched between the inner races of the bearings 41. The driven shaft 40 has a shoulder 40a on which the inner race of the bearing 41 within the disk of the first member 38 sits. The shoulder 40a limits axial movement of the inner race of the associated bearing 41.

The second member 39 is provided coaxially therethrough with a hole 39a, which snugly accommodates the boss 38b of the first member 38 so that the second member 39 will be slideably mounted on the boss 38b of the first member 38. The second member 39 has a boss 39b, which extends coaxially from the end surface remote from the first member 38 and which has a coaxial recess 39e of circular cross-section at the distal end thereof. The diameter of the recess 39e is greater than that of the hole 39a, which opens at the bottom of the recess 39e. The boss 38b extends into but terminates within the recess 39e. The driven shaft 40 extends through the recess 39e.

A nut 43 and an annular plate 44 are coaxially mounted on the driven shaft 40, and are accommodated within the recess 39e. The nut 43 threadedly engages the driven shaft 40 and abuts the annular plate 44 to adjustably press the annular plate 44 against the end surface of the inner race of the bearing 41 at the distal end of the boss 38b. Since the shoulder 40a limits axial movement of the inner race of the adjacent bearing 41 and the sleeve 42 is sandwiched between the inner races of the bearings 41, the nut 43 can press the annular plate 44 against the shoulder 40a of the driven shaft 40 by way of the inner races of the bearings 41 and the sleeve 42. Therefore, the annular plate 44 can be fixed to the driven shaft 40 by tightening the nut 43, and is actually fixed. Since the bearings 41 rest in the respective steps 38c, they prevent axial movement of the first member 38 relative to the driven shaft 40 when the nut 43 is tightened.

The adjacent or opposing end surfaces of the first and second members 38 and 39 are respectively provided with opposing tapered surfaces 38d and 39c of equal dimensions at their outer portions. The tapered surfaces 38d and 39c define a pulley groove of the driven pulley 37. The V-belt 36 fits into the pulley groove of the driven pulley 37 to engage the latter. Thus, the V-belt 36 drivingly connects the driving pulley 30 to the driven pulley 37. Since the second member 39 is slideably mounted on the boss 38b of the first member 38, the second member 39 can move axially relative to the first member 38. Axial displacement of the second member 39 relative to the first member 38 changes the radius of contact between the V-belt 36 and the driven pulley 37, and thus also changes the effective diameter of the driven pulley 37. The pulleys 30 and 37 are generally aligned with each other. The center distance between the pulleys 30 and 37 is fixed, because the shafts 29 and 40 are rigidly supported on the body of the vehicle. The V-belt 36 is stiff and its length is essentially unchangeable. As a result of the fixed center distance between the pulleys 30 and 37 and the unchangeable length of the V-belt 36, the effective diameter of one of the pulleys 30 and 37 increases as that of the other pulley decreases.

Figure 4:
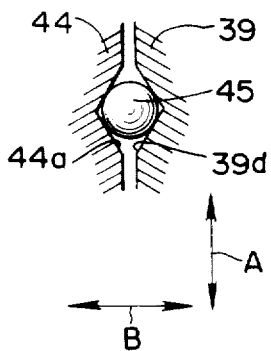
FIG. 4 is a cross-sectional view of part of the driven pulley taken along line IV—IV of FIG. 3.

Identical rigid balls 45 are provided between the annular plate 44 and the second member 39, and are accommodated within the recess 39e. As best shown in FIG. 4, wherein the arrow A denotes the circumferential direction and the arrow B denotes the axial direction with respect to the driven shaft 40, the opposing end surfaces of the annular plate 44 and the second member 39 are provided with pairs of opposing grooves 44a and 39d respectively which extend radially with respect to the driven shaft 40 and which have bilaterally-symmetric V-shaped cross-sections. The grooves 44a are identical and spaced at equal angular intervals in the circumferential direction with respect to the driven shaft 40. The grooves 39d are similar to but arranged opposite of the grooves 44a. Each of the balls 45 is restrained between a pair of opposing grooves 44a and 39d. Therefore, the balls 45 engage the second member 39 and the annular plate 44 in the circumferential direction but allow axial movement of the second member 39 relative to the first member 38. The size of the balls 45 is chosen so as to prevent direct contact between the second member 39 and the annular plate 44, and so as to maintain the circumferential engagement between the second member 39 and the annular plate 44 even when the second member 39 moves to its limit of separation from the annular plate 44. The radial dimensions of the grooves 44a and 39d are essentially the same as the diameter of the balls 45 so as to prevent radial displacements of the balls 45. In fact, the boss 39b of the second member 39, the annular plate 44 and the boss 38b of the first member 38 define radially-facing ends of the grooves 44a and 39d, and can essentially contact the balls 45 to limit radial displacements thereof.

In operation, while the vehicle is running at a constant speed or accelerating with the brake pedal 26b released, the clutch 28 disengages the driving shaft 29 from the output shaft 27 of the transmission 17, so that the driving shaft 29 and the driving pulley 30 are generally at rest. In this case, the first and second members 31 and 32 are as close as possible due to the force of the spring 34. As a result, the effective diameter of the driving pulley 30 is at its maximum, while that of the driven pulley 37 is its minimum.

When the brake pedal 26b is depressed, the brake system 26 comes into operation to brake the vehicle and the clutch 28 connects the driving shaft 29 to the output shaft 27 of the transmission 17. The engagement of the driving shaft 29 and the output shaft 27 causes the generator 46 to be drivingly connected to the output shaft 27 to receive torque or kinetic energy from the front-wheel drive train and the vehicle. As a result the generator 46 begins to produce electric power, and exerts a load on the front-wheel drive train and the vehicle. The engagement of the clutch 28 causes the flywheel 47 to start rotating. As a result, the flywheel 47 exerts a load on the front-wheel drive train and the vehicle. These loads from the operation of the generator 46 and the flywheel 47 facilitate braking of the vehicle. Electric power produced by the generator 46 is stored in the battery 11 via the rectifier 46a and is used in the other electrical devices.

While the brake pedal 26b is depressed, torque or kinetic energy is transmitted from the front-wheel drive train to the generator 46 via the output shaft 27, the clutch 28, the driving shaft 29, the driving pulley 30, the V-belt 36, the driven pulley 37, and the driven shaft 40. Specifically, torque on the driving shaft 29 and the driving pulley 30 is transmitted to the driven pulley 37 via the V-belt 36, and further to the driven shaft 40 via the second member 39, the balls 45, and the annular plate 44.

At the start of the engagement of the clutch 28, since the generator 46 and the flywheel 47 are originally at rest, a great reaction force occurs and travels to the clutch 28 via the pulleys 30 and 37, etc. Specifically, the reaction force is transmitted from one of the inclined surfaces of each groove 44a to the associated ball 45, and further to the diametrically-opposed inclined surface of the groove 39d. The vector sum of forces resulting from the reaction force and exerted on each of the balls 45 via the diametrically-opposed two surfaces of the grooves 44a and 39d is in such a direction as to move the ball 45 away from the crotch of the groove 44a along the inclined surface thereof. When the reaction force is sufficiently great, this resultant force actually moves each of the balls 45 away from the crotch of groove 44a along the inclined surface thereof. Thus, the balls 45 move away from the annular plate 44, axially displacing the second member 39 toward the first member 38 and increasing the effective diameter of the driven pulley 37. Since each of the balls 45 moves along one of the inclined surfaces of the associated groove 44a and thus moves in a circumferential direction relative to the annular plate 44, the second member 39 is also displaced slightly in a circumferential direction relative to the annular plate 44 while the balls 45 move. The rotatable structure of the first member 38 by the bearings 41 allows this relative circumferential displacement of the second member 39 while the V-belt 36 securely holds the second member 39 to the first member 38. The increase in the effective diameter of the driven pulley 37 causes the V-belt 36 around the driving pulley 30 to move radially toward the driving shaft 29 while axially displacing the second member 32 away from the first member 31 against the force of the spring 34, thereby reducing the effective diameter of the driving pulley 30. These changes in the effective diameters of the driving and driven pulleys 30 and 37 reduce the speed ratio of this pulley coupling or increase the torque ratio thereof, and thus facilitates the start of rotation of the driven pulley 37, the generator 46, and the flywheel 47. As a result, the V-belt 36 is prevented from slipping along the pulleys 30 and 37, and so the service life thereof is increased.

As the speed of the driven shaft 40 increases, the reaction force through the driven pulley 37 decreases. The reduction of the reaction force permits the balls 45 to return toward the annular plate 44, and also permits the second member 39 to be displaced away from the first member 38 by the force of the spring 34 which is transmitted via the second member 32 of the driving pulley 30 and the V-belt 36. Thus, the increase in the speed of the driven shaft 40 reduces the effective diameter of the driven pulley 37, and increases that of the driving pulley 30 due to the force of the spring 34. These changes in the effective diameters of the driving and driven pulley 30 and 37 increase the speed ratio of this pulley coupling or reduce the torque ratio thereof, and thus facilitates high-speed rotation of the driven shaft 40 and high-power operation of the generator 46.

When the brake pedal 26b is released, the clutch 28 disengages the driving shaft 29 from the output shaft 27 of the transmission 17. As a result, the generator 46 and the flywheel 47 exert no load on the front-wheel drive train and especially the engine 15. After the disengagement of the clutch 28, the flywheel 47 can still rotate due to inertia, driving the generator 46.

In this way, the driving and driven pulleys 30 and 37, and the V-belt 36 constitute a coupling which has an automatically variable speed or torque ratio action. This action ensures the effective transmission of kinetic energy from the front-wheel drive train and the vehicle to the generator 46 and the flywheel 47 when braking of the vehicle is required.

Figure 5:
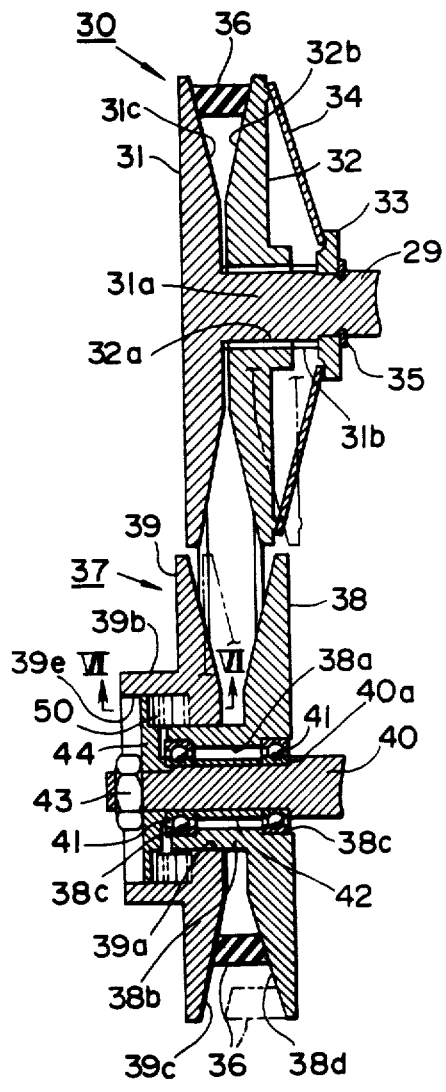
FIG. 5 is a cross-sectional view of driving and driven pulleys according to a second embodiment of this invention.
Figure 6A:
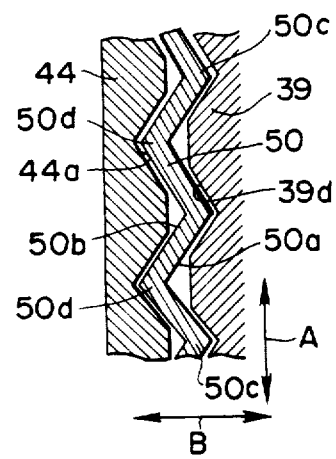
FIG. 6A is a cross-sectional view of part of the driven pulley taken along line VI—VI of FIG. 5.
Figure 6B:
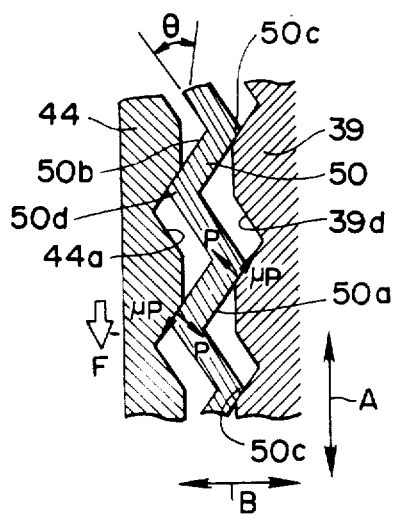
FIG. 6B is a view similar to that of FIG. 6A showing the situation in which the second member is more distant from the annular plate than in FIG. 6A.

FIGS. 5, 6A, and 6B show an essential portion of a second embodiment of this invention, which is designed in a manner similar to that of the previous first embodiment except for the following difference: a ring 50 is coaxially provided between an annular plate 44 and a second member 39 of a driven pulley 37.

As best shown in FIGS. 6A and 6B, wherein the arrow A denotes the circumferential direction and the arrow B denotes the axial direction, the periphery of the surface of the annular plate 44 opposing the second member 39 is provided with a plurality of radially extending grooves 44a of bilaterally-symmetric V-shaped cross-section. These grooves 44a are spaced at equal angular circumferential intervals. The surface of the second member 39 opposing the annular plate 44 is provided with a plurality of grooves 39d similar to the grooves 44a.

Both surfaces of the ring 50 are provided with radially extending grooves 50a and 50b of bilaterally-symmetric V-shaped cross-section so that the circumferential profile of the ring 50 will be zigzag and that the opposite surfaces of the ring 50 will have bilaterally-symmetric V-shaped projections 50c and 50d. The projections 50c on the surface opposing the second member 39 mate with and are received in the respective grooves 39d. The projections 50d on the other surface opposing the annular plate 44 mate with and are received in the respective grooves 44a. Thus, the ring 50 connects the annular plate 44 to the second member 39 in the circumferential direction while permitting axial movement of the second member 39.

As easily understood from FIG. 6B, the rotating force F exerted on the annular plate 44 is given by the following equation:

$$F = P \sin \theta + \mu P \cos \theta$$

where P is the force applied to the ring 50 from the inclined surfaces of the grooves 44 and perpendicular to the inclined surfaces, $\mu$ is the coefficient of friction, and $\theta$ is the angle of inclination of the surfaces of the grooves 50b with respect to a plane perpendicular to the central axes of the ring 50 and the annular plate 44. The ring 50 applies a force Q to the second member 39 in such a direction as to move the second member 39 away from the annular plate 44. The force Q is given by $$Q = P \cos \theta - \mu P \sin \theta$$

because angular design of the grooves 50a is similar to that of the grooves 50b. The combination of the above two equations gives $$Q = F \cdot (1 - \mu \tan \theta)/(\tan \theta + \mu).$$

Thus, the force Q is proportional to the force F. The force Q balances the force of the spring 34. As the force Q increases, the ring 50 moves, for example, from a position shown in FIG. 6A to another position shown in FIG. 6B so that the second member 39 axially approaches the first member 38, increasing the effective diameter of the driven pulley 37 while reducing that of a driving pulley 30. As the force Q decreases, the second member 39 moves in the opposite direction, reducing the effective diameter of the driven pulley 37 while increasing that of the driving pulley 30. In this way, this second embodiment operates in a manner similar to that of the previous first embodiment.

Figure 7:
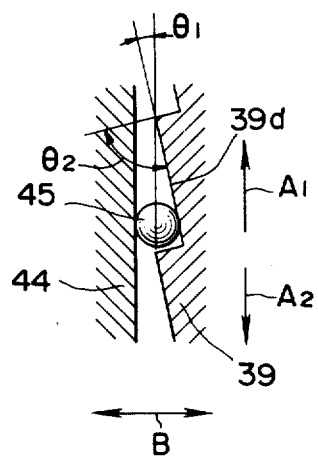
FIG. 7 is a cross-sectional view similar to those of FIGS. 4, 6A, and 6B showing part of a driven pulley according to a first modification of this invention.

FIG. 7 shows a first modification of the first embodiment. The distinguishing features of this modification are that the surface of the annular plate 44 opposing the second member 39 of a driven pulley 37 (see FIG. 3) is flat, and that opposing surfaces of each groove 39d in the second member 39 are inclined with respect to a plane perpendicular to the central axis of the second member 39 at different angles $\theta_1$ and $\theta_2$. The size of each ball 45 is chosen so that the ball 45 will not contact the larger surface of the associated groove 39d when the ball 45 contacts both the annular plate 44 and the smaller surface of the groove 39d.

When the second member 39 rotates relative to the annular member 44 in the direction denoted by the arrow $A_1$ of FIG. 7, torque is not transmitted to the annular member 44 since the balls 45 rotate and freely permit the relative rotation of the second member 39. When the second member 39 rotates relative to the annular member 44 in the opposite direction $A_2$, the balls 45 are pressed into hard contact with both the annular member 44 and the second member 39 while a great sliding friction occurs between the annular member 44 and the balls 45. As a result, torque is transmitted to the annular member 44. In this way, this pulley coupling operates in a manner similar to a one-way clutch, preventing transmission of kinetic energy from the flywheel 47 (see FIG. 1) to a front-wheel drive train and a vehicle (see FIG. 1).

Figure 8:
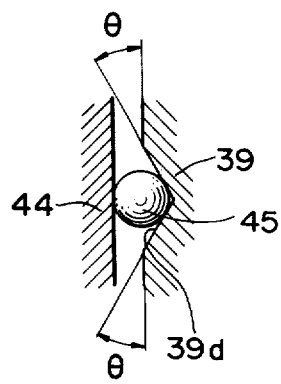
FIG. 8 is a cross-sectional view similar to those of FIGS. 4, 6A, 6B and 7 showing part of a driven pulley according to a second modification of this invention.

FIG. 8 shows a second modification of the first embodiment. The distinguishing features of this modification are that the surface of the annular plate 44 opposing the second member 39 of a driven pulley 37 (see FIG. 3) is flat, and that balls 45 are respectively received in grooves 39d with bilaterally opposing inclined surfaces of equal slope $\theta$. This configuration ensures transmission of torque from the second member 39 to the annular plate 44 but prevents that of torque from the annular plate 44 to the second member 39. Thus, this modification operates in a manner similar to the previous first modification.

It should be understood that further modifications and variations may be made in this invention without departing from the spirit and scope of this invention as set forth in the appended claims. For example, the balls 45 in the first embodiment are not limited to a complete sphere and may have two opposite flat surfaces. Additionally, a pulley having the same structure as that of the driving pulley 30 may be used on the driven side, while a pulley having the same structure as that of the driven pulley 37 may be used on the driving side.

What is claimed is:

1. A waste kinetic energy reclaiming system for a vehicle having an engine operable for driving the vehicle and brakes operated by means of a brake pedal, the system comprising:
   (a) a generator;
   (b) a variable torque ratio coupling means for connecting the generator and the engine at variable torque ratios; and
   (c) a clutch, responsive to the application of said brake pedal for connecting said generator to said engine via said coupling means, and responsive to said brake pedal being released to disconnect said generator from said engine.

2. A waste kinetic energy reclaiming system as recited in claim 1, wherein the coupling means includes first and second pulleys having variable effective diameters and a fixed length belt looping said first and second pulleys to drivingly connect them, the distance between respective centers of the first and second pulleys being fixed whereby the effective diameter of the first pulley increases as the effective diameter of the second pulley decreases and vice versa, the first pulley being operably connected to the clutch, and the second pulley being operably connected to the generator.

3. The waste kinetic energy reclaiming system of claim 1, wherein said variable torque ratio coupling means is operable to initially establish a high torque ratio connection between said generator and said engine to facilitate starting of said generator and to thereafter lower said torque ratio as said generator increases in speed relative to said engine to facilitate high speed operation of said generator.

4. A waste kinetic energy reclaiming system for a vehicle having an engine driving the vehicle having brakes, the system comprising:
   (a) a generator;
   (b) coupling means for coupling the generator and the engine at variable torque ratios, said coupling means comprising first and second pulleys having variable effective diameters and a fixed length belt looping said first and second pulleys to drivingly connect them, the distance between respective centers of the first and second pulleys being fixed whereby the effective diameter of the first pulley increases as that of the second pulley decreases and vice versa, said second pulley being connected to the generator; and
   (c) a clutch connected to said first pulley via a driving shaft and responsive to an application of said brakes for connecting said engine to said generator via said coupling means; said first pulley further comprising opposing first and second disks, the first disk being rigidly mounted on the driving shaft, a spline for rotatingly engaging the second disk with the driving shaft whereby an axial distance between the first and second disks is variable, the first and second disks having opposing tapered surfaces defining a groove having a V-shaped cross-section for receiving the belt whereby the effective diameter of the first pulley increases as the second disk axially approaches the first disk, and a spring engaging the driving shaft and the second disk and operable to urge the second disk toward the first disk.

5. A waste kinetic energy reclaiming system for a vehicle having an engine driving the vehicle having brakes, the system comprising:
   (a) a generator;
   (b) coupling means for coupling the generator and the engine at variable torque ratios, said coupling means comprising first and second pulleys having variable effective diameters and a fixed length belt looping said first and second pulleys to drivingly connect them, the distance between respective centers of the first and second pulleys being fixed whereby the effective diameter of the first pulley increases as that of the second pulley decreases and vice versa, a driven shaft for connecting the second pulley to the generator; and
   (c) a clutch connected to said first pulley and responsive to the application of said brakes for connecting said engine to said generator via said coupling means; wherein the second pulley further comprises opposing first and second disks, the first disk being rotatably mounted on the driven shaft, and restrained from moving axially with respect to the driven shaft, and means for connecting the second disk to the driven shaft said connecting means being operable for rotating the second disk while allowing for axial movement with respect to the driven shaft so that a distance between the first and second disks is variable, the first and second disks having opposing tapered surfaces defining a groove having a V-shaped cross-section for receiving the belt, whereby the effective diameter of the second pulley increases as the second disk axially approaches the first disk.

6. A waste kinetic energy reclaiming system as recited in claim 5, wherein the clutch includes an annular plate rigidly mounted on the driven shaft, and an interposed member slideably engaging both the second disk and the annular plate to connect the second disk to the driven shaft.

7. A waste kinetic energy reclaiming system as recited in claim 6, wherein the interposed member includes a ball, and wherein the annular plate and the second disk have opposing grooves respectively for receiving the ball.

8. A waste kinetic energy reclaiming system as recited in claim 7, wherein the opposing grooves extend radially and have a V-shaped cross-section.

9. A waste kinetic energy reclaiming system as recited in claim 6, wherein the annular plate and the second disk have opposing grooves respectively disposed on their opposing surfaces, and wherein the interposed member includes a ring having a zigzag profile and dimensioned to be receivable in the opposing grooves of the annular plate and the second disk.

10. A waste kinetic energy reclaiming system as recited in claim 9, wherein the opposing grooves of the annular plate and the second disk extend radially and have a V-shaped cross-section.

11. A waste kinetic energy reclaiming system as recited in claim 6, wherein interposed member includes a ball contacting both the annular plate and the second disk, wherein the second disk has a groove for receiving the ball, and wherein the annular plate has a flat surface for contacting the ball.

12. A waste kinetic energy reclaiming system as recited in claim 11, wherein the groove extends radially and has a symmetric V-shaped cross-section.

13. A waste kinetic energy reclaiming system as recited in claim 11, wherein the groove extends radially and has a V-shpaed cross-section, and wherein adjacent surfaces of the groove have different slopes.

14. A waste kinetic energy reclaiming system for a vehicle having an engine operable for driving the vehicle and having brakes, the system comprising:
   (a) a generator;
   (b) a variable torque ratio coupling means for connecting the generator and the engine at variable torque ratios; and
   (c) a clutch, responsive to an application of said brakes for connecting said generator to said engine via said coupling means, and responsive to said brakes being released to disconnect said generator from said engine; and a flywheel connected to the coupling means to be driven along with the generator.

* * * * *